United States Patent
Jaffe et al.

(10) Patent No.: US 12,244,592 B2
(45) Date of Patent: *Mar. 4, 2025

(54) REQUESTING AND TRANSMITTING DATA FOR RELATED ACCOUNTS

(71) Applicant: Google LLC, Mountain View, CA (US)

(72) Inventors: Elliot Jaffe, Mountain View, CA (US); Antonio Trapanese, Mountain View, CA (US); Cong Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 615 days.

This patent is subject to a terminal disclaimer.

(21) Appl. No.: 17/358,130

(22) Filed: Jun. 25, 2021

(65) Prior Publication Data

US 2021/0320920 A1    Oct. 14, 2021

Related U.S. Application Data

(63) Continuation of application No. 16/707,124, filed on Dec. 9, 2019, now Pat. No. 11,075,905.

(51) Int. Cl.
*H04L 9/06* (2006.01)
*H04L 9/40* (2022.01)
(Continued)

(52) U.S. Cl.
CPC ........ *H04L 63/0869* (2013.01); *H04L 9/0643* (2013.01); *H04L 67/133* (2022.05); *H04L 67/306* (2013.01)

(58) Field of Classification Search
CPC . H04L 63/0869; H04L 67/133; H04L 9/0643; H04L 67/306
(Continued)

(56) References Cited

U.S. PATENT DOCUMENTS

| | | | | |
|---|---|---|---|---|
| 8,458,775 B2* | 6/2013 | Lester | ................. | H04L 51/04 |
| | | | | 713/185 |
| 8,949,940 B1* | 2/2015 | Shenoy | ................. | G06Q 10/10 |
| | | | | 707/636 |

(Continued)

FOREIGN PATENT DOCUMENTS

CN    20190340385    *    3/2016

OTHER PUBLICATIONS

Anjuli Kannan; Smart Reply: Automated Response Suggestion for Email; ACM: 2016; pp. 955-964.*

(Continued)

*Primary Examiner* — Monjur Rahim
(74) *Attorney, Agent, or Firm* — Botos Churchill IP Law (57) ABSTRACT

Systems and methods for efficiently and securely requesting and receiving, from a remote service, data for multiple accounts associated with the same device or application. In one example, a client device is configured to request application data for all accounts associated with the device or application installation using a single remote procedure call, rather than requiring separate calls for each account, and to do so by providing a single identifier rather than including identifiers specific to each associated account. The remote service is further configured to return the requested information in a manner that obfuscates the account identifiers and thus limits their potential use if the communication is intercepted, such that the application data can be efficiently transmitted together even where security or other concerns would otherwise dictate that separate transmissions should be made for each account.

18 Claims, 5 Drawing Sheets

(51) Int. Cl.
   *H04L 67/133* (2022.01)
   *H04L 67/306* (2022.01)
(58) Field of Classification Search
   USPC .............................................................. 726/7
   See application file for complete search history.

(56) References Cited

U.S. PATENT DOCUMENTS

| | | | | |
|---|---|---|---|---|
| 9,160,816 | B2* | 10/2015 | McDougall | H04L 67/567 |
| 10,460,098 | B1* | 10/2019 | Wang | H04L 63/0838 |
| 10,574,770 | B2* | 2/2020 | Vyrros | H04L 67/55 |
| 2007/0244987 | A1 | 10/2007 | Pedersen et al. | |
| 2009/0138562 | A1* | 5/2009 | Schmulen | H04L 51/08 |
| | | | | 709/206 |
| 2011/0055585 | A1* | 3/2011 | Lee | H04L 9/3218 |
| | | | | 713/183 |
| 2012/0233668 | A1* | 9/2012 | Leafe | G06F 9/44526 |
| | | | | 726/4 |
| 2013/0073859 | A1* | 3/2013 | Carlson | H04L 9/3247 |
| | | | | 713/176 |
| 2013/0097279 | A1* | 4/2013 | Polis | H04L 67/00 |
| | | | | 709/217 |
| 2014/0025461 | A1* | 1/2014 | Knowles | G06Q 30/0222 |
| | | | | 705/14.51 |
| 2014/0059226 | A1* | 2/2014 | Messerli | H04L 67/51 |
| | | | | 709/226 |
| 2016/0014228 | A1* | 1/2016 | McDougall | H04L 67/10 |
| | | | | 709/203 |
| 2016/0072793 | A1* | 3/2016 | Brock | H04L 63/083 |
| | | | | 726/6 |
| 2016/0234209 | A1 | 8/2016 | Kahol et al. | |
| 2017/0070527 | A1* | 3/2017 | Bailey | H04L 43/12 |
| 2019/0019190 | A1 | 1/2019 | Agrawal et al. | |
| 2019/0108515 | A1* | 4/2019 | Lakka | G06Q 20/38215 |
| 2019/0340385 | A1* | 11/2019 | Alsina | H04L 9/0866 |
| 2020/0073739 | A1 | 3/2020 | Rungta et al. | |
| 2021/0320920 | A1* | 10/2021 | Jaffe | G06F 21/606 |

OTHER PUBLICATIONS

The Extended European Search Report for European Patent Application No. 22189054.4, Dec. 14, 2022, 8 Pages.
International Search Report and Written Opinion for Application No. PCT/US2020/047991 dated Oct. 8, 2020.
Merriam-Webster, "registry", 2021 (Year: 2021).
Weber, "What is Backend as a Service and What Does It Mean for Devs", 2021 (Year: 2021).
Wikipedia, "Mobile Backend as a service", 2021 (Year: 2021).
Du, Jiang, et al., "A WS-Inspection Based Decentralized Service Discovery Service in OGSA", International Conference on Communication Technology Proceedings, 2003. ICCT 2003, 9 pages.
Mülli, Alexander, "A Decentralized Bitcoin Exchange with Bitsquare—Attack Scenarios and Countermeasures", Master Thesis, Communication Systems Group (CSG), Department of Informatics (IFI), University of Zurich, Switzerland, Jul. 30, 2015, 61 pages.

* cited by examiner

Client Device or Application makes a remote procedure call to Registry Service requesting application data for the Application, passing at least the associated Application Installation ID or the Device ID

204

Registry Service uses Application Installation ID or Device ID to identify the Account IDs for all accounts that are known to be logged-in and associated with the Application Installation ID or the Device ID

206

Registry Service makes separate remote procedure calls to Application Backend Service using each of the Account IDs identified in the preceding step

208

Application Backend Service separately responds to each remote procedure call from the Registry Service by transmitting to the Registry Service the requested application data associated with each identified Account ID

502 — Registry Service performs one or more hash functions on the identified Account IDs 504 — Registry Service sorts two or more of the identified Account IDs by their hashed Account IDs 506 — Registry Service truncates each hashed Account ID to a predefined length to obtain a truncated hash value for each account 508 — Registry Service creates a data structure that associates the application data for each account with its truncated hash value, ordered according to the previous sorting step 510 — Registry Service transmits the data structure to the Client Device 512 — Client Device or Application performs the same sorting method, hash function(s), and truncation of each Account ID that is logged into the Application 514 — With respect to the data structure received from the Registry Service, the Client Device or Application uses the truncated hash values and/or sorting order to determine what application data corresponds to each Account ID

REQUESTING AND TRANSMITTING DATA FOR RELATED ACCOUNTS

CROSS-REFERENCE TO RELATED APPLICATIONS

This application is a continuation of U.S. application Ser. No. 16/707,124, filed Dec. 9, 2019, the entire disclosure of which is incorporated by reference herein.

BACKGROUND

As the number and variety of networked applications, products, and services has continued to expand, it has become increasingly common for users to access multiple related accounts from a single device or application. For example, users may maintain multiple email accounts that are all accessed from a single email application, or multiple bank accounts that are all accessed from a single banking application. The same trend can be seen with networked consumer products, each of which can be treated as a separate "account" in this context. For example, users may access data from multiple thermostats, security systems, and electronic door locks, all from a single "smart home" application. Unfortunately, requesting and transmitting data for multiple accounts can detrimentally impact the speed and usability of networked services and applications.

BRIEF SUMMARY

The present technology relates to systems and methods for efficiently and securely requesting and receiving, from a remote service, data for multiple accounts associated with the same device or application. In particular, the technology enables a client device to request application data for all accounts associated with the device or application installation using a single remote procedure call, rather than requiring separate calls for each account. The technology also enables the client device to request this information by providing a single identifier such as an application installation ID or device ID, rather than requiring the client device to include identifiers specific to each account (account IDs) in the remote procedure call, which may raise security or other concerns. Furthermore, the technology enables the remote service to return the requested information in a manner that obfuscates the account IDs and thus limits their potential use if the communication is intercepted. This approach allows all application data to be transmitted together even where security or other concerns would otherwise dictate that separate transmissions should be made for each account ID.

In one aspect, the disclosure describes a method of managing requests for account data over a network. The method comprises: receiving, by one or more processors of a registry service, a remote procedure call from a client device that includes a first identifier; identifying, by the one or more processors, from data maintained by the registry service, a plurality of second identifiers corresponding to a plurality of accounts that are associated with the first identifier; obtaining, by the one or more processors, application data for each of the plurality of accounts from an application backend service; performing, by the one or more processors, one or more hash functions on each of the plurality of second identifiers to obtain a hash value for each of the plurality of accounts; reducing, by the one or more processors, each of the hash values to a predefined length to obtain a truncated hash value for each of the plurality of accounts; generating a data structure by the one or more processors, the data structure comprising an entry for each of the plurality of accounts that associates the truncated hash value for the account with the application data received for the account, and which does not include any of the plurality of second identifiers; and transmitting the data structure from the registry service to the client device. The method may further include transmitting, from the registry service to the application backend service, a separate remote procedure call for each of the plurality of second identifiers, each separate remote procedure call including only one of the plurality of second identifiers. In some aspects, generating the data structure at the registry service further comprises ordering at least two entries of the data structure based on a sorting of information relating to the accounts represented in the at least two entries of the data structure. In some aspects, generating the data structure at the registry service further comprises ordering at least two entries of the data structure based on the second identifier corresponding to the account represented in each of the at least two entries of the data structure. In some aspects, generating the data structure at the registry service further comprises ordering at least two entries of the data structure based on the hash value corresponding to the account represented in each of the at least two entries of the data structure. In some aspects, the one or more hash functions performed on at least two of the plurality of second identifiers are not the same. Although the application data within the data structure can be any type of information, in some aspects it comprises a number of messages associated with each of the plurality of accounts.

In another aspect, the disclosure describes a method of requesting and receiving account data over a network. The method comprises: transmitting, from a client device to a registry service, a remote procedure call that includes a first identifier; identifying, by one or more processors of the client device, a plurality of second identifiers corresponding to a plurality of accounts that are associated with the first identifier; performing, by the one or more processors, one or more hash functions on each of the plurality of second identifiers to obtain a hash value for each of the plurality of accounts; reducing, by the one or more processors, each of the hash values to a predefined length to obtain a truncated hash value for each of the plurality of accounts; receiving, by the one or more processors, a data structure from the registry service, the data structure comprising an entry for each of the plurality of accounts that associates the truncated hash value for a corresponding account with application data for the corresponding account, and which does not include any of the plurality of second identifiers; and identifying, by the one or more processors, which application data within the data structure corresponds to each of the plurality of accounts using at least the truncated hash values for each of the plurality of accounts. In some aspects, identifying which application data within the data structure corresponds to each of the plurality of accounts further comprises using the order of at least two of the entries of the data structure. In some aspects, the application data within the data structure comprises a number of messages associated with each of the plurality of accounts. For example, the number of messages associated with each of the plurality of accounts may represents a number of unread messages or a number of total messages associated with each of the plurality of accounts. In some aspects, the method may further include generating, by the one or more processors, an indication on the client device of the number of messages associated with each of the plurality of accounts. For example, the indication on the client device may comprise one or more of a visible, audible, or tactile indication. In some aspects, the plurality of accounts is associated with a single application installation on the client device. For example, the single application may be an installation of one of an email application, a social media application, or a banking application.

DETAILED DESCRIPTION

The present technology will now be described with respect to the following exemplary systems and methods.

Example Systems

Figure 1:
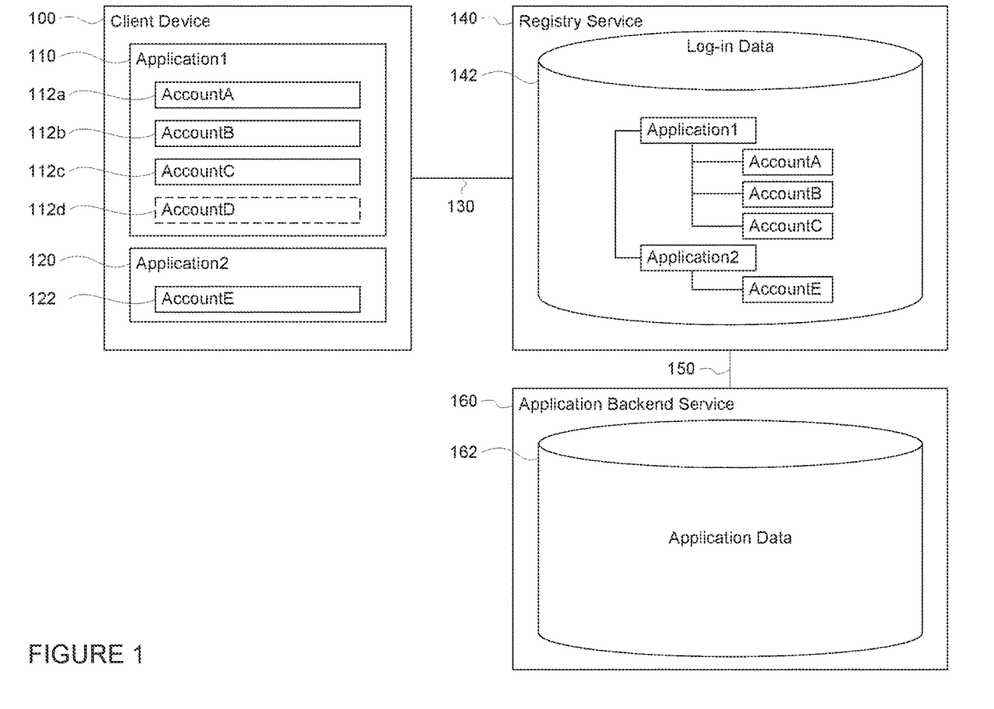
FIG. 1 is a functional diagram of an example system in accordance with aspects of the disclosure.

FIG. 1 schematically illustrates one embodiment of an example system in accordance with the present technology. Client device 100 can be any device, such as a personal computer, mobile phone, netbook, tablet PC, PDA, or wearable device. In the embodiment of FIG. 1, client device 100 is shown running two applications 110 and 120, one or both of which may be any type of application such as email applications, social media applications, banking applications, etc. Application 110 is shown being associated with a plurality of accounts 112. Accounts 112a, 112b, and 112c represent accounts that are currently logged-in on client device 100. Account 112d, shown in dashed lines, represents an account that has previously been logged-in on device 100, but which is currently logged-out on device 100. The second application 120 is shown having a single account 122 that is currently logged-in. Although referred to herein as "accounts," elements 112 and 122 may also refer to any other types of profiles, avatars, or linked services or devices. For example, accounts 112 could each represent a single thermostat, sensor, camera, or electric lock in a "smart home" or security system.

The applications are configured to request application data from a remote service over connection 130. Connection 130 may be any type of wired or wireless connection such as cellular networks, wide-area networks, local area networks, etc., as well as any interconnected combination(s) thereof such as the Internet. In the embodiment of FIG. 1, the remote service is comprised of a registry service 140 and an application backend service 160. Registry service 140 and application backend service 160 are connected via connection 150, which also may be any type of wired or wireless connection, as well as any interconnected combination(s) thereof. In addition, registry service 140 and application backend service 160 may be processes running on a single computing device or a distributed set of devices (e.g., a server farm), in which case connection 150 may represent internal connections within that computing device or across the set of devices.

Registry service 140 maintains a server-side view of the accounts that are logged into each installed application and/or device. Thus, in the embodiment of FIG. 1, registry service 140 maintains log-in data 142 indicating that accounts 112a, 112b, and 112c are logged into application 110 on device 100, and that account 122 is logged into application 120 on device 100. In other embodiments, registry service 140 may be application-specific, and, for example, only maintain data regarding which accounts are logged into application 110 on device 100. Registry service 140 and log-in data 142 may be resident on the same computing device. Alternatively, registry service 140 may be running on a first computing device, and log-in data 142 may be maintained in one or more separate computing devices such as database servers or separate networked storage devices.

Application backend service 160 is the source for the application data 162 associated with each account. For example, application backend service 160 may be one or more servers containing the email messages associated with accounts 112, the social media profile data associated with accounts 112, and/or the banking data associated with accounts 112. Similarly, application backend service 160 may be one or more devices or servers to which a plurality of thermostats, cameras, sensors, electric locks, or other "smart home" devices associated with accounts 112 are connected. Application backend service 160 and application data 162 may be resident on the same computing device. Alternatively, application backend service 160 may be running on a first computing device, and application data 162 may be maintained in one or more separate computing devices such as database servers or separate networked storage devices. In addition, although application backend service 160 is only shown having a connection 150 to registry service 140, it may also have a separate direct or indirect connection to client device 100.

As discussed above, client device 100 may be any type of computing device including a personal computer, mobile phone, netbook, tablet PC, PDA, or wearable device. Likewise, registry service 140 and application backend service 160 may be processes resident on one or more computing devices. In all cases, these computing devices may include one or more processors, memory and other components typically present in general purpose computing devices. The memory may store information accessible by the one or more processors, including instructions and data that may be executed or otherwise used by the processor(s). The memory may be of any type capable of storing information accessible by the processor(s), including a computing device-readable medium. The memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

The computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available CPUs. Alternatively, the one or more processors may be a dedicated device such as an ASIC or other hardware-based processor. Each processor may further have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel. Further, as noted above, the computing devices on which registry service 140 and application backend service 160 are resident may comprise one or more servers. In that regard, those servers may be part of a load-balanced server farm or cloud-based system.

The computing devices described herein may store instructions capable of being executed directly (such as machine code) or indirectly (such as scripts) by the processor(s). The computing devices may also store data (e.g., log-in data 142 and application data 162), which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

In addition to the systems described above and illustrated in the figures, various operations will now be described. In that regard, there are multiple ways that application 110 could be configured to request application data for accounts 112a, 112b, and 112c. For example, application 110 could be configured to make separate remote procedure calls directly to application backend service 160 for each account. However, this has the drawback of increasing latency, which may become unacceptably long over slower or intermittent data connections and/or where applications require authentication steps for each transmission. Latency concerns such as these can be particularly unacceptable for applications where users typically spend only a matter of seconds or factions of a second checking for updates, as is common with email and social media services.

Alternatively, application 110 could be configured to make a single remote procedure call directly to application backend service 160 in which application data for all logged-in accounts is requested together. However, this has the drawback of sending calls that could, if intercepted, expose the associations between multiple account IDs, which can present security concerns. For example, some users may use separate accounts that are otherwise unlikely to be correlated (e.g., a personal email account and a different account for the user to send emails under the name of the user's business or trade name). If a third party could discover that the user's personal email account was associated with the same device ID or application installation ID as other the user's other email account(s), the user's security measures would be thwarted. Likewise, in certain circumstances, the associations between multiple accounts could also reveal associations between friends or family members who have used that application or device, and thus pose security risks to other users. There may be numerous other ways in which the associations between multiple account IDs may be used maliciously.

In view of these drawbacks, the present technology provides an approach in which application 110 is configured to make a single remote procedure call to registry service 140, rather than making a remote procedure call directly to application backend service 160. Examples of this proposed method are described below and illustrated in the flow diagrams of FIGS. 2-5. While various operations will now be described, it should be understood that the following operations do not have to be performed in the precise order described below. Rather, various steps can be handled in a different order or simultaneously, and steps may also be added or omitted, unless expressly stated otherwise.

Figure 2:
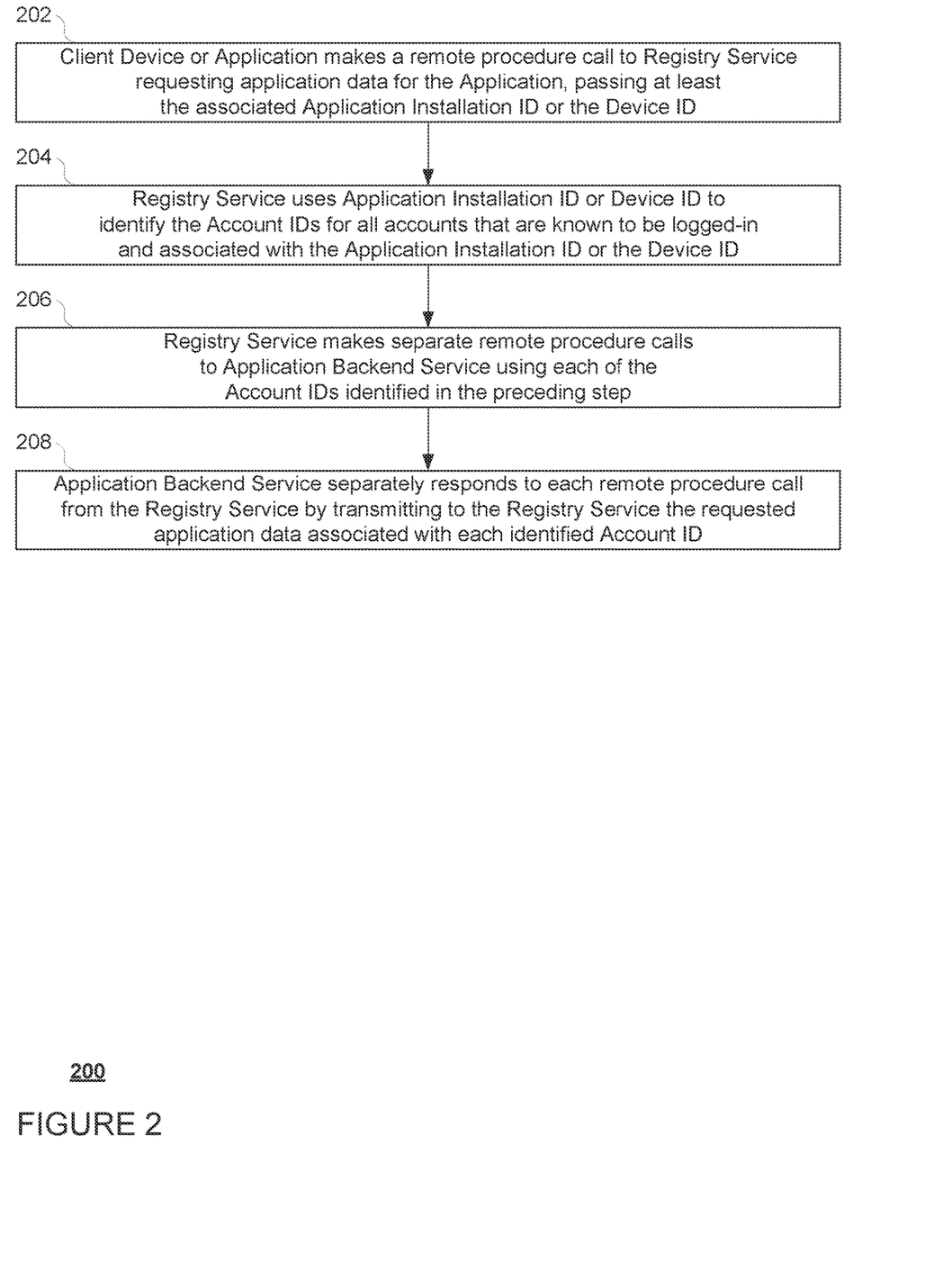
FIG. 2 is a flow diagram of an exemplary method in accordance with aspects of the disclosure.

As shown in step 202 of example 200 of FIG. 2, client device 100 and/or application 110 makes a remote procedure call to registry service 140 requesting application data for application 110. Step 202 may be performed by application 110, or by one or more other processes running on client device 100. The remote procedure call includes at least an identifier associated with client device 100 (hereinafter a "device ID") or the installed instance of application 110 on client device 100 (hereinafter an "application installation ID"). A device ID may be sufficient if registry service 140 is specific to application 110, or if registry service 140 can otherwise determine that an instance of application 110 made the remote procedure call. Client device 100 and/or application 110 may be further configured to provide registry service 140 with credentials for at least one of accounts 112a, 112b, or 112c, e.g., one or more usernames and passwords, authentication tokens, or any other data sufficient to authenticate the request as to at least one of the accounts. In some contexts, however, it may not be necessary to authenticate the request, in which case credentials need not be sent to registry service 140. In addition, though not required, application 110 may further be configured to identify to registry service 140 a callback function to be invoked by registry service 140 when it requests the application data from application backend service 160.

In the examples set forth herein, the application installation ID of application 110 may be any text, number, string, image, or other data that identifies the installed instance of application 110 on device 100 which initiates the remote procedure call. Each installation of application 110 on device 100 will generate a new application installation ID. Likewise, a device ID associated with device 100 may be any text, number, string, image, or other data that identifies device 100. For example, the device ID may be a hardware identifier such as a MAC address of device 100. It also may be sufficient in certain contexts for the device ID to be something less permanent, such as the assigned IP address of device 100.

Continuing with the example of FIG. 2, following receipt of the remote procedure call (and, where applicable, one or more authentication steps if one or more credentials are provided to registry service 140), registry service 140 acts as a "delegate" for client device 100 and handles all further communications with application backend service 160. In that regard, at step 204, registry service 140 uses the application installation ID or device ID to identify the account IDs for all accounts that are known to be logged-in and associated with the application installation ID or device ID. For example, in the system of FIG. 1, if application 110 sends a remote procedure call to registry service 140, then registry service 140 would use the application installation ID of application 110 or a device ID associated with client device 100 to find the account IDs associated with accounts 112a, 112b, and 112c. In all examples set forth herein, the account IDs associated with accounts 112a, 112b, and 112c may be any text, number, string, image, or other data that identifies accounts 112a, 112b, and 112c. For example, if accounts 112a, 112b, and 112c are email accounts, the account ID for each account may be their associated email address, user name, account number, etc.

Next, at step 206, registry service 140 makes separate remote procedure calls to application backend service 160 using each of the account IDs identified in step 204 in order to obtain the requested application data associated with those account IDs. In response, at step 208, application backend service 160 separately responds to each remote procedure call by transmitting to registry service 140 the application data associated with each identified account ID. For example, in the system of FIG. 1, application backend service 160 would receive a separate remote procedure call and would transmit a separate response for each of accounts 112a, 112b, and 112c that includes the requested application data associated with each respective account. In all examples set forth herein, application data associated with accounts 112a, 112b, and 112c may be any data specific to accounts 112a, 112b, and 112c. For example, if accounts 112a, 112b, and 112c are email accounts, the application data may be one or more emails the accounts, the number of new messages, unread messages, or total messages associated with each account, etc.

Figure 3:
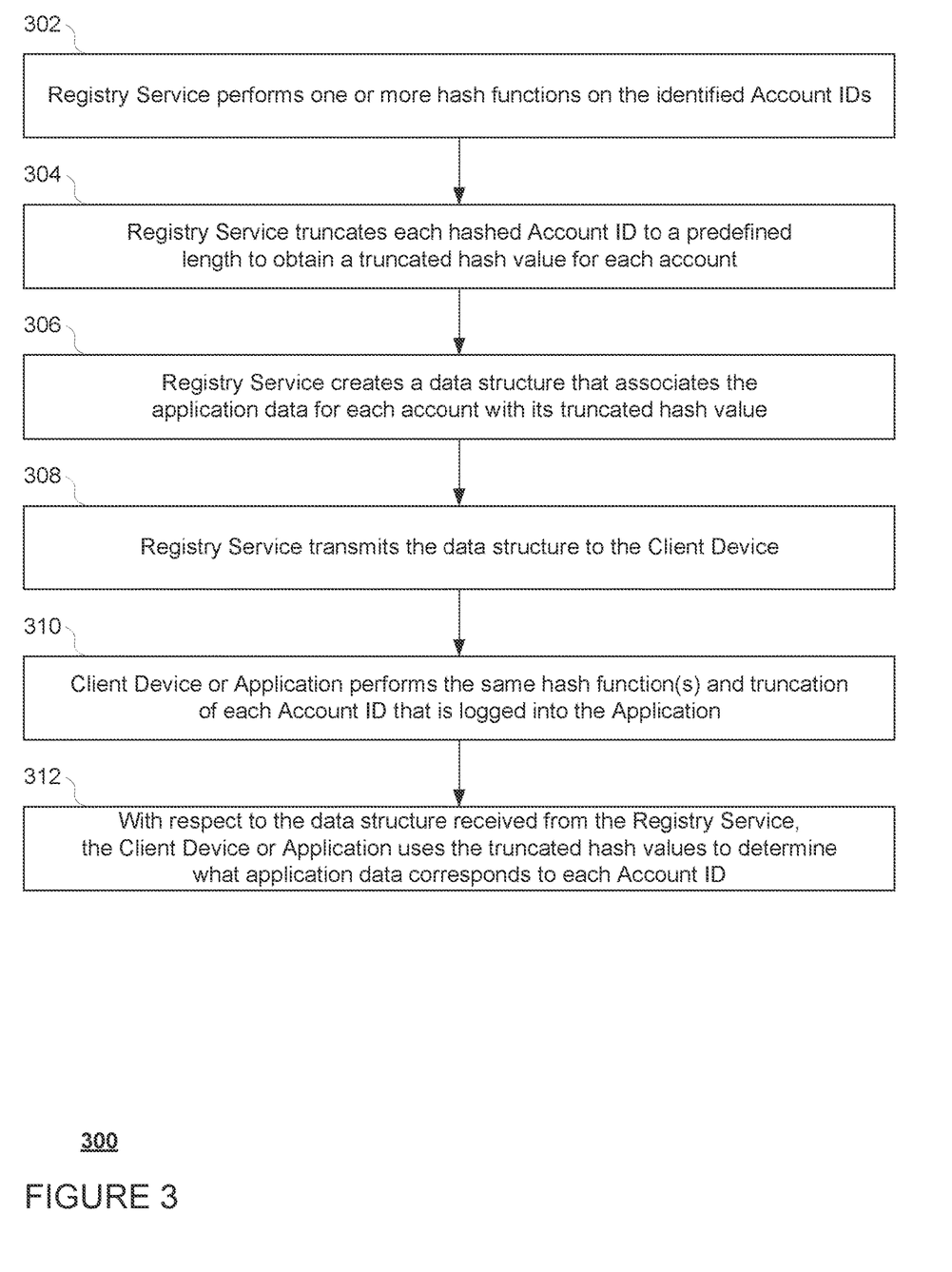
FIG. 3 is a flow diagram of an exemplary method in accordance with aspects of the disclosure.
Figure 4:
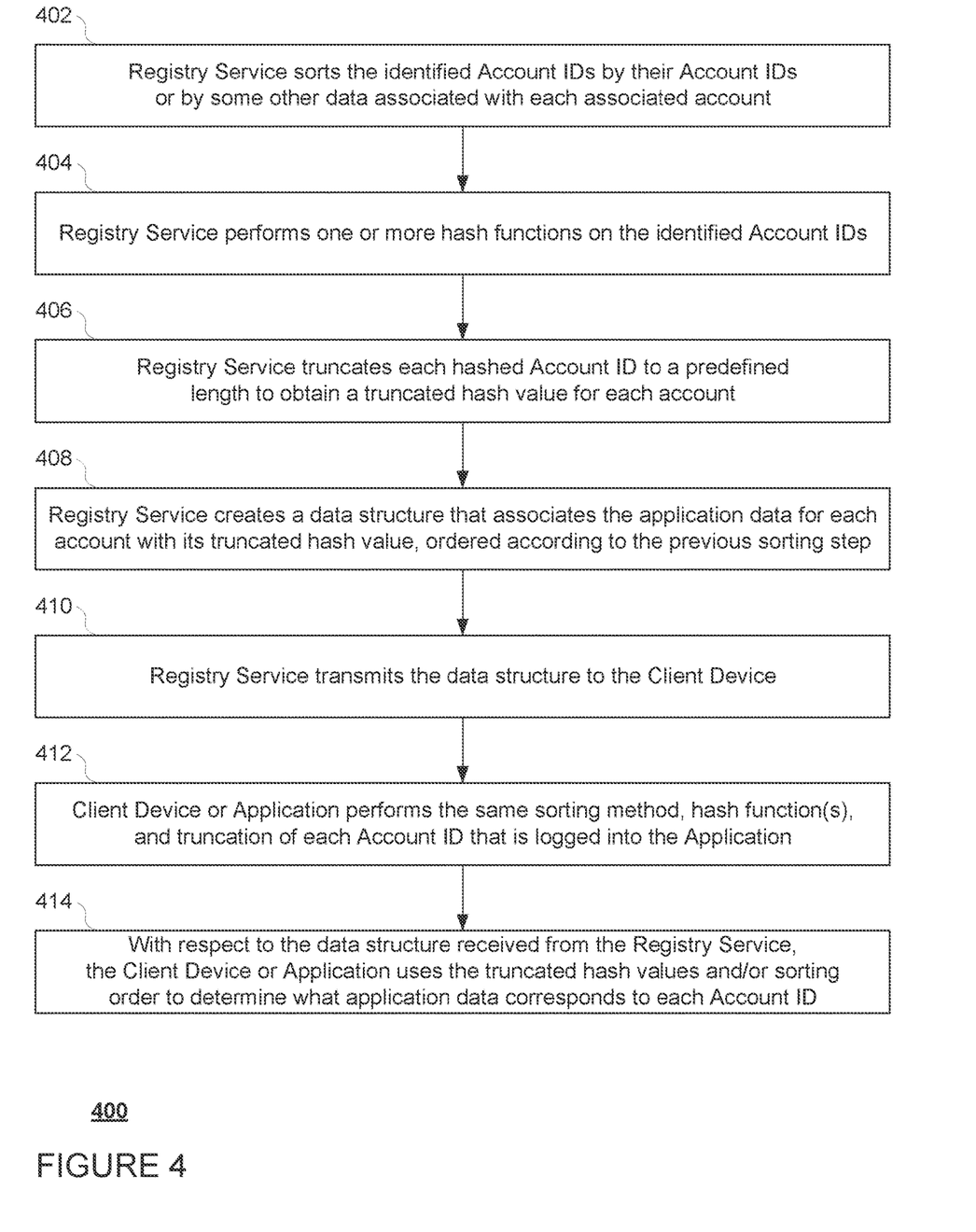
FIG. 4 is a flow diagram of an exemplary method in accordance with aspects of the disclosure.
Figure 5:
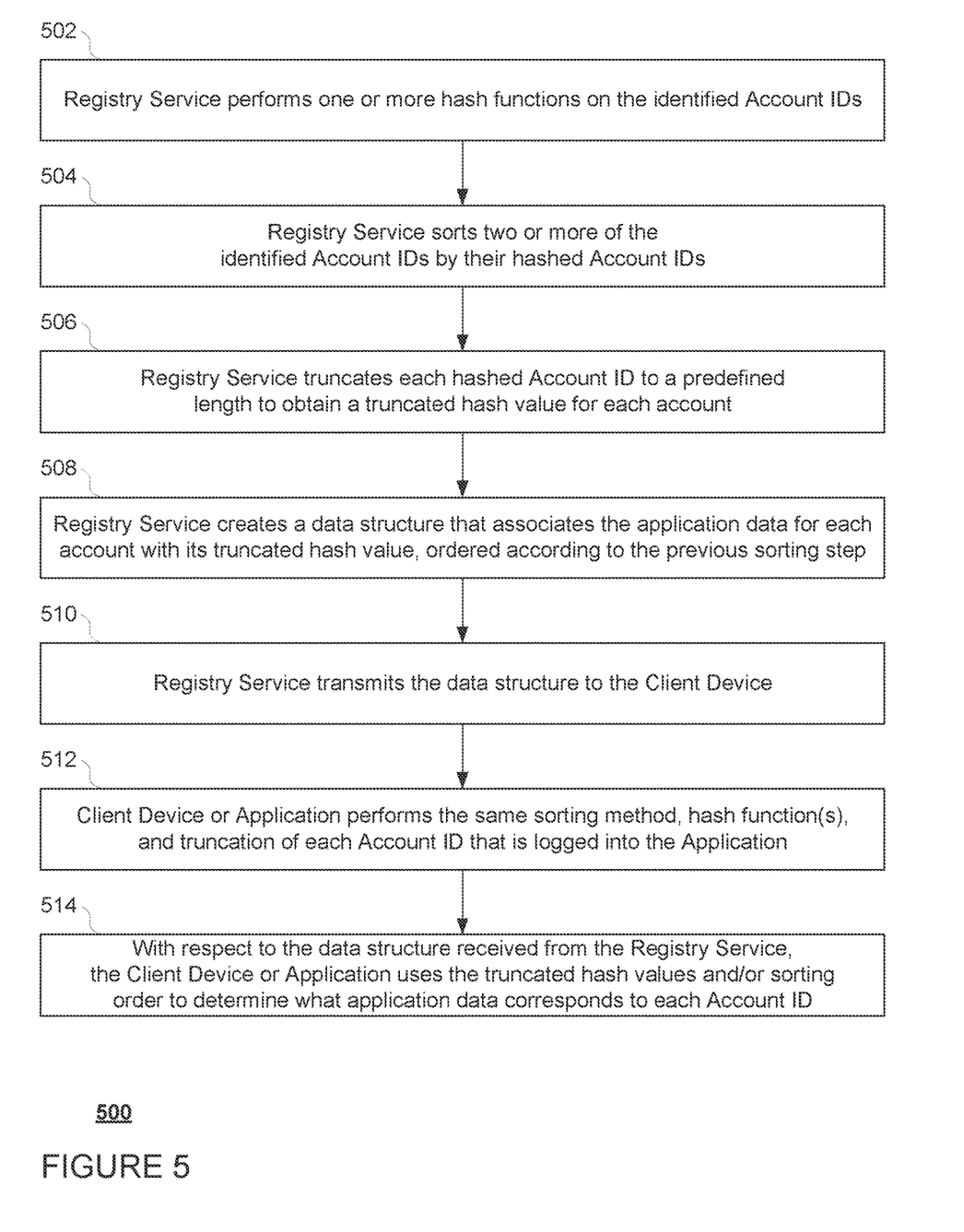
FIG. 5 is a flow diagram of an exemplary method in accordance with aspects of the disclosure.

After registry service 140 receives the application data for accounts 112a, 112b, and 112c at step 208, the exemplary method may proceed as shown in either FIG. 3, FIG. 4, or FIG. 5.

In the example 300 of FIG. 3, at step 302, registry service 140 performs one or more hash functions on the identified account IDs. For example, in the system of FIG. 1, registry service 140 would perform a hash function on the account IDs for accounts 112a, 112b, and 112c. In all examples discussed herein, the hash function may be any type of hash function, such as SHA-256, MD5, etc.

Next, at step 304, registry service 140 truncates each hashed account ID to a predefined length, resulting in a truncated hash value for each account. For example, the hashed account IDs may be truncated to 8 bits, which would allow for 256 unique 8-bit values. In other examples, the truncation may be to fewer than 8 bits (e.g., 4-6 bits) or more than 8 bits (e.g., 10-16 bits).

Although steps 302 and 304 are described in this example as taking place after application backend service 160 transmits the application data associated with each identified account ID in accordance with step 208 of FIG. 2, one or both of the actions described in steps 302 and 304 may alternatively take place prior to the actions described in step 208 of FIG. 2.

At step 306, registry service 140 creates a data structure that associates, for each account, the application data received from application backend service 160 (i.e., the data received in step 208 of FIG. 2, above) with the truncated hash value for that account.

Then, at step 308, registry service 140 transmits the data structure to client device 100. By way of example, the data structure can be a table or any other type and format of data structure that is capable of associating each account's application data with its corresponding truncated hash value.

At step 310, client device 100 and/or application 110 determines from its own data which accounts are currently logged into application 110, and then hashes each of the account IDs associated with those logged-in accounts and truncates the resulting hash values using the same hash function(s) and truncation procedure as was used by registry service 140 in steps 302 and 304. The output of step 310 is thus a set of truncated hash values corresponding to the accounts that are currently logged into application 110. Finally, in step 312, client device 100 and/or application 110 uses the set of truncated hash values generated in the step 310 as a key to determine, within the data structure received in step 308 from registry service 140, what application data corresponds to each of the accounts logged into application 110. Both of steps 310 and 312 may be performed by application 110, or by one or more other processes running on client device 100.

One benefit of truncating the hashed account IDs as set forth above with respect to FIG. 3 (and below with respect to steps 406 and 506 of FIGS. 4 and 5) is that, for a service with a very large number of accounts (e.g., a service with 1 billion accounts or more) and a low average number of accounts per application installation or device (e.g., 2-3 accounts per application installation or device), there can be a very low probability (e.g., less than 5% chance) that two or more of the account IDs associated with a single application installation ID or device ID will end up producing the same truncated hash values (i.e., producing "collisions"), while those truncated hash values will necessarily match those of a very large number of other users' accounts. For example, if a service has 1 billion accounts, and 8-bit truncated hash values are being used, then roughly 3.9 million accounts will generate each of the 256 possible truncated hash values, while there is a less than 2% chance that a set of three accounts associated with the same application installation ID or device ID will end up causing a collision.

As a result, in these examples, even if a third party were to intercept the transmission from registry service 140 back to client device 100, the truncated hash values would be of very little, if any, use to the third party in creating a reverse lookup table or otherwise identifying the actual account IDs associated with the installation ID or device ID. This is because a large number of unrelated account IDs will also generate those same truncated hash values. On the other hand, because client device 100 already knows the account IDs for accounts 112a, 112b, and 112c, it can use them to generate its own list of truncated hash values. This list of truncated hash values then can be used as a key to decipher the data structure received from registry service 140 and thus determine what application data corresponds to each of accounts 112a, 112b, and 112c. Thus, rather than using values that uniquely identify each account, the examples set forth herein operate counter to conventional thinking by utilizing truncated hash values that will necessarily cause collisions and thus provide users with anonymity.

The length of the truncated hash values may be shortened or lengthened based on one or more factors, such as the type of application, total number of accounts, average number of accounts per application installation ID or device ID, etc. In this way, the length of the truncated hash value can be "tuned" for a given set of factors so as to provide a suitably small likelihood of collisions for the accounts associated with a single application installation ID or device ID, while providing a suitably high likelihood of collisions between the accounts of all users. What constitutes "suitably small" and "suitably high" likelihoods will vary based on implementation, and will ultimately depend on what the implementer deems suitable under their particular circumstances. For example, in some implementations, a 10% chance of collisions between accounts associated with a single application installation ID may be deemed "suitably small." The likelihood of such collisions is analogous to the "birthday problem" or "birthday paradox" (which pertains to the likelihood that at least two people in a group will share the same birthday), and can be calculated according to well-known statistical formulas. Thus, for truncated hash values that are b bits in length, the likelihood P of at least one "collision" occurring in a set of n truncated hash values can be approximated as follows:

$$P = 1 - e^{-\left(\frac{n^2}{2 \times 2^b}\right)}.$$

Nevertheless, even with optimal tuning, there may be instances in which two or more account IDs associated with the same application installation ID or device ID will generate the same truncated hash values. This may be deemed acceptable in certain applications. However, there are also ways to limit the negative impact of such collisions. Two such examples are set forth in FIGS. 4 and 5.

In the example 400 of FIG. 4, at step 402, registry service 140 sorts the account IDs that were identified at step 204 of FIG. 2. The registry service 140 may perform this sorting procedure according to the account IDs themselves (e.g., by placing the account IDs in alphabetical or numerical order), or according to some other data associated with each associated account (e.g., by ordering the account IDs according to the profile name, email address, or bank account number associated with each respective account).

After sorting, at steps 404 and 406, registry service 140 hashes each of the identified account IDs and creates truncated hash values for each account in the same manner as described above with respect to steps 302 and 304 of FIG. 3. Although steps 402, 404, and 406 are described in this example as taking place after application backend service 160 transmits the application data associated with each identified account ID in accordance with step 208 of FIG. 2, one or more of the actions described in steps 402, 404, and 406 may alternatively take place prior to the actions described in step 208 of FIG. 2.

At step 408, registry service 140 creates a data structure in the same manner as described above with respect to step 306 of FIG. 3, except that, in the method of FIG. 4, registry service 140 orders the data structure according to how the account IDs were sorted in step 402. Ordering the data structure may encompass listing each entry of the data structure in the order set in step 402, or simply including a number or other indication for each entry of the data structure regarding how its account ID was ranked in step 402. Next, at step 410, registry service 140 transmits the data structure to client device 100.

At step 412, client device 100 and/or application 110 determines from its own data which accounts are currently logged into application 110, and then performs the same sorting function(s), hashing function, and truncation method as was used by registry service 140 in steps 402, 404, and 406. Step 412 thus results in an ordered set of truncated hash values corresponding to the accounts that are logged into application 110.

Finally, in step 414, client device 100 and/or application 110 uses the ordered set of truncated hash values generated in the step 412 as a key to determine, within the data structure received in step 410 from registry service 140, what application data corresponds to each of the accounts logged into application 110. In that regard, if none of the truncated hash values generated in step 412 end up causing a collision, then client device 100 and/or application 110 need not consider the ordering of the data structure in order to determine what application data corresponds to each of the accounts logged into application 110. However, if two or more of the truncated hash values generated in step 412 do end up causing a collision, then client device 100 and/or application 110 can use the ordering of the data structure in order to determine which application data corresponds to each of those accounts. Both of steps 412 and 414 may be performed by application 110, or by one or more other processes running on client device 100.

In the example 500 of FIG. 5, at step 502, registry service 140 begins by hashing the account IDs that were identified at step 204 of FIG. 2. This hashing step may be performed in the same manner as described above with respect to step 302 of FIG. 3. Then, at step 504, registry service 140 sorts two or more of the hashed account IDs that were generated in step 502 according to the hashed account IDs (e.g., by placing two or more of the hashed account IDs in alphabetical or numerical order). In that regard, registry service 140 may be configured to sort all of the hashed account IDs, or only those that generate the same truncated hash values. If registry service 140 is configured to sort only those hashed account IDs that generate the same truncated hash values, steps 504 and 506 may be performed in reverse order, or an additional truncation step may be performed prior to step 504. At step 506, registry service 140 truncates each hashed account ID in the same manner as described above with respect to step 304 of FIG. 3. Although steps 502, 504, and 506 are described in this example as taking place after application backend service 160 transmits the application data associated with each identified account ID in accordance with step 208 of FIG. 2, one or more of the actions described in steps 502, 504, and 506 may alternatively take place prior to the actions described in step 208 of FIG. 2. At step 508, registry service 140 creates a data structure in the same manner as described above with respect to step 408, except that, in the method of FIG. 5, registry service 140 orders two or more of the entries of the data structure according to how the hashed account IDs were sorted in step 504. In this example, ordering the data structure may encompass listing the two or more entries of the data structure in the order set in step 504, or simply including a number or other indication for the two or more entries regarding how their hashed account IDs were ranked in step 504. Finally, steps 510, 512, and 514 of FIG. 5 proceed in the same manner as described above with respect to steps 410, 412, and 414 of FIG. 4, respectively.

In addition to the examples described above with respect to FIGS. 4 and 5, it will be appreciated that there are other ways of avoiding the negative impact of collisions between two or more account IDs associated with the same application installation ID or device ID. For example, in response to two or more account IDs generating the same truncated hash value, registry service 140 may be configured to use one or more additional hash functions on those account IDs until they generate truncated hash values that are distinct.

Client device 100 and/or application 110 would then be configured to follow the same process flow as registry service 140, thus allowing them to arrive at the same set of truncated hash values used in the data structure received from registry service 140.

As another example, registry service 140 and client device 100 (or application 110) could be configured to respond to a collision by sending a truncated version of the unhashed account ID for one or more of the matching account IDs rather than the truncated hash values for those account IDs. Thus, in the exemplary system of FIG. 1, if the account IDs associated with accounts 112a and 112b end up generating the same truncated hash value, registry service 140 and client device 100 (or application 110) could be configured to instead truncate one or both of the matching account IDs.

As another example, registry service 140 and client device 100 (or application 110) could be configured to respond to a collision by sending one or more additional digits for each hash value.

In a further example, registry service 140 and client device 100 (or application 110) may be configured to respond to a collision by sending the first n bits, letters, digits, etc. of the hashed account IDs as opposed to the last n bits, digits, letters, etc. of the hashed account IDs. Likewise, registry service 140 and client device 100 (or application 110) could be configured to respond to a collision by sending some other contiguous or noncontiguous subset of n bits, letters, digits, etc. from the hashed account IDs. This could be done for all accounts, or only those whose account IDs end up generating a collision.

Finally, for applications where an account ID need not be constant, registry service 140, client device 100, or application 110 could simply be configured to respond to a collision by requesting that application backend service 160 assign a new account ID for one of the accounts so that it will no longer produce collisions with the other account IDs associated with that application installation ID or device ID.

While the alternatives mentioned above are all possible, the choice of whether to use sorting or any of the alternatives just mentioned may depend on a variety of situation-specific factors such as the total number of accounts, the average number of accounts per application installation ID or device ID, the length of the account IDs, the length of the truncated hash values, the sensitivity of the account IDs and their association with the application installation ID or device ID, processing speeds of the registry service 140 and/or client device 100, transmission speeds between the registry service 140 and client device 100, etc.

In addition to the advantages already mentioned, another benefit of the methods and systems described above is that they will provide protection even in the potential failure modes where the registry service's data has become outdated for some reason. For example, in the exemplary system of FIG. 1, even if registry service 140's log-in data 142 incorrectly indicates that account 112d is also currently logged-in to application 110, that will simply result in registry service 140 returning a data structure to client device 100 and/or application 110 that includes additional unneeded application data. Client device 100 and/or application 110 will thus still be able to determine what data corresponds to the accounts that really are logged-in (i.e., accounts 112a, 112b, and 112c) and can simply ignore the extra application data corresponding to account 112d. Critically, because that extra application data for account 112d was associated with the truncated hash value, this additional information does not risk identifying that account 112d is also associated with client device 100, application 110, or accounts 112a, 112b, and 112c.

On the other hand, if registry service 140's log-in data 142 incorrectly indicates that only accounts 112a and 112b are currently logged-in to application 110 (i.e., it does not reflect that account 112c is also logged-in), client device 100 and/or application 110 will still receive a data structure that includes data for accounts 112a and 112b, and client device 100 and/or application 110 can then make follow-up requests until the registry service 140's log-in data 142 has been refreshed. Here again, because client device 140 can make each request using its application installation ID or device ID, and registry service 140 returns a data structure identified by truncated hash values, the associations between client device 100, application 110, and accounts 112a, 112b, 112c, and 112d continue to be protected.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A method, comprising:
    identifying, by one or more processors, from data maintained by a registry service, a plurality of second identifiers corresponding to a plurality of accounts that are associated with a first identifier;
    performing, by the one or more processors, one or more hash functions on each of the plurality of second identifiers to obtain a hash value for a set of accounts;
    reducing, by the one or more processors, each of the hash values to a predefined length to obtain a truncated hash value for each account of the set;
    generating a data structure comprising an entry for each account that associates the truncated hash value for that account with application data associated with the account, and which does not include any of the plurality of second identifiers; and
    transmitting, to an application backend service, a separate remote procedure call for each of the plurality of second identifiers.

2. The method of claim 1, further comprising transmitting the data structure to a client computing device.

3. The method of claim 1, wherein each account is one of a profile, an avatar, a linked service, or a linked device.

4. The method of claim 1, wherein the first identifier is associated with an application on a client computing device.

5. The method of claim 4, wherein the first identifier corresponds to a request for application data of the application.

6. The method of claim 1, further comprising obtaining, by the one or more processors, application data for each account of the set.

7. The method of claim 6, wherein the application data for each account of the set is obtained from an application backend service.

8. The method of claim 1, wherein generating the data structure further comprises:
 ordering at least two entries of the data structure based on a sorting of information relating to the accounts represented in the at least two entries of the data structure;
 ordering at least two entries of the data structure based on the second identifier corresponding to the account represented in each of the at least two entries of the data structure; or
 ordering at least two entries of the data structure based on the hash value corresponding to the account represented in each of the at least two entries of the data structure.

9. The method of claim 1, wherein the one or more hash functions are not the same.

10. The method of claim 1, wherein the application data comprises a number of messages associated with each account of the set.

11. A method, comprising:
 identifying, by one or more processors of a client device, a plurality of second identifiers corresponding to a plurality of accounts that are associated with a first identifier;
 performing, by the one or more processors, one or more hash functions on each of the plurality of second identifiers to obtain a hash value for each of the plurality of accounts;
 reducing, by the one or more processors, each of the hash values to a predefined length to obtain a truncated hash value for each of the plurality of accounts; and
 identifying, by the one or more processors, which application data within a data structure corresponds to each of the plurality of accounts using at least the truncated hash values for each of the plurality of accounts, wherein the data structure comprises an entry for each of the plurality of accounts that associates the truncated hash value for a corresponding account with application data for the corresponding account, and which does not include any of the plurality of second identifiers; and
 transmitting, from the client device to a registry service, a single remote procedure call that includes the first identifier.

12. The method of claim 11, further comprising receiving the data structure from the registry service.

13. The method of claim 11, wherein identifying which application data within the data structure corresponds to each of the plurality of accounts further comprises using the order of at least two of the entries of the data structure.

14. The method of claim 11, wherein the application data within the data structure comprises a number of messages associated with each of the plurality of accounts.

15. The method of claim 14, wherein:
 the number of messages associated with each of the plurality of accounts represents a number of unread messages associated with each of the plurality of accounts; or
 the number of messages associated with each of the plurality of accounts represents a number of total messages associated with each of the plurality of accounts.

16. The method of claim 11, further comprising:
 generating, by the one or more processors, an indication on the client device of a number of messages associated with each of the plurality of accounts.

17. The method of claim 11, wherein the plurality of accounts is associated with a single application installation on the client device.

18. The method of claim 17, wherein the single application installation is an installation of one of an email application, a social media application, or a banking application.

* * * * *